United States Patent [19]
Breden et al.

[11] Patent Number: 4,571,219
[45] Date of Patent: Feb. 18, 1986

[54] BICYCLE TRANSMISSION

[75] Inventors: Charles R. Breden, Westmont; Zygmunt Danielczyk, Chicago, both of Ill.

[73] Assignee: Daniel Corporation, Westmont, Ill.

[21] Appl. No.: 357,842

[22] Filed: Mar. 15, 1982

Related U.S. Application Data

[63] Continuation-in-part of Ser. No. 187,083, Sep. 15, 1980, abandoned.

[51] Int. Cl.⁴ .............................................. F16H 11/08
[52] U.S. Cl. .......................................... 474/70; 474/77
[58] Field of Search .................... 474/50, 70, 77, 80, 474/82, 28; 74/750 B; 280/236, 237, 238; 403/355, 356

[56] References Cited

U.S. PATENT DOCUMENTS

| | | | |
|---|---|---|---|
| 2,117,116 | 5/1938 | Page | 474/77 |
| 2,933,952 | 4/1960 | Schou | 474/29 X |
| 3,492,883 | 2/1970 | Maeda | 474/80 |
| 3,742,777 | 7/1973 | Mathauser | 474/110 X |
| 3,769,848 | 11/1973 | McGuire | 474/70 |
| 3,830,521 | 8/1974 | Gardel et al. | 280/236 |
| 3,861,227 | 1/1975 | Hunt | 474/77 X |
| 3,885,814 | 5/1975 | Rizzo | 280/217 |
| 4,061,046 | 12/1977 | Lang | 474/70 |
| 4,183,262 | 1/1980 | Segawa | 74/594.2 |
| 4,198,876 | 4/1980 | Nagano | 74/243 R |
| 4,201,094 | 5/1980 | Rathmell | 280/236 X |
| 4,280,341 | 7/1981 | Krude | 403/355 X |

FOREIGN PATENT DOCUMENTS

| | | | |
|---|---|---|---|
| 446694 | 2/1948 | Canada | 474/77 |
| 1006288 | 4/1957 | Fed. Rep. of Germany | 474/80 |
| 2518496 | 5/1976 | Fed. Rep. of Germany | 474/28 |
| 830162 | 7/1938 | France | 474/80 |
| 485036 | 9/1953 | Italy | 474/80 |
| 366203 | 1/1963 | Switzerland | 474/80 |
| 603786 | 6/1948 | United Kingdom | 474/77 |

Primary Examiner—Rodney H. Bonck
Assistant Examiner—Dwight G. Diehl
Attorney, Agent, or Firm—Robert E. Wagner; Ralph R. Rath

[57] ABSTRACT

An automatic transmission system for a chain-driving vehicle includes a frame having a crank-driven sprocket and a drive axle with a drive wheel supported on the drive axle and a multi-speed sprocket assembly for driving the drive wheel. A contonous chain drive engages the crank-driven sprocket and is engageable with each of the sprockets of the sprocket assembly. An actuating means is supported on the drive wheel spaced from the drive axle and is actuated by centrifugal force for shifting the chain to respective sprockets of the sprocket assembly in response to changes in speed of the vehicle.

5 Claims, 9 Drawing Figures

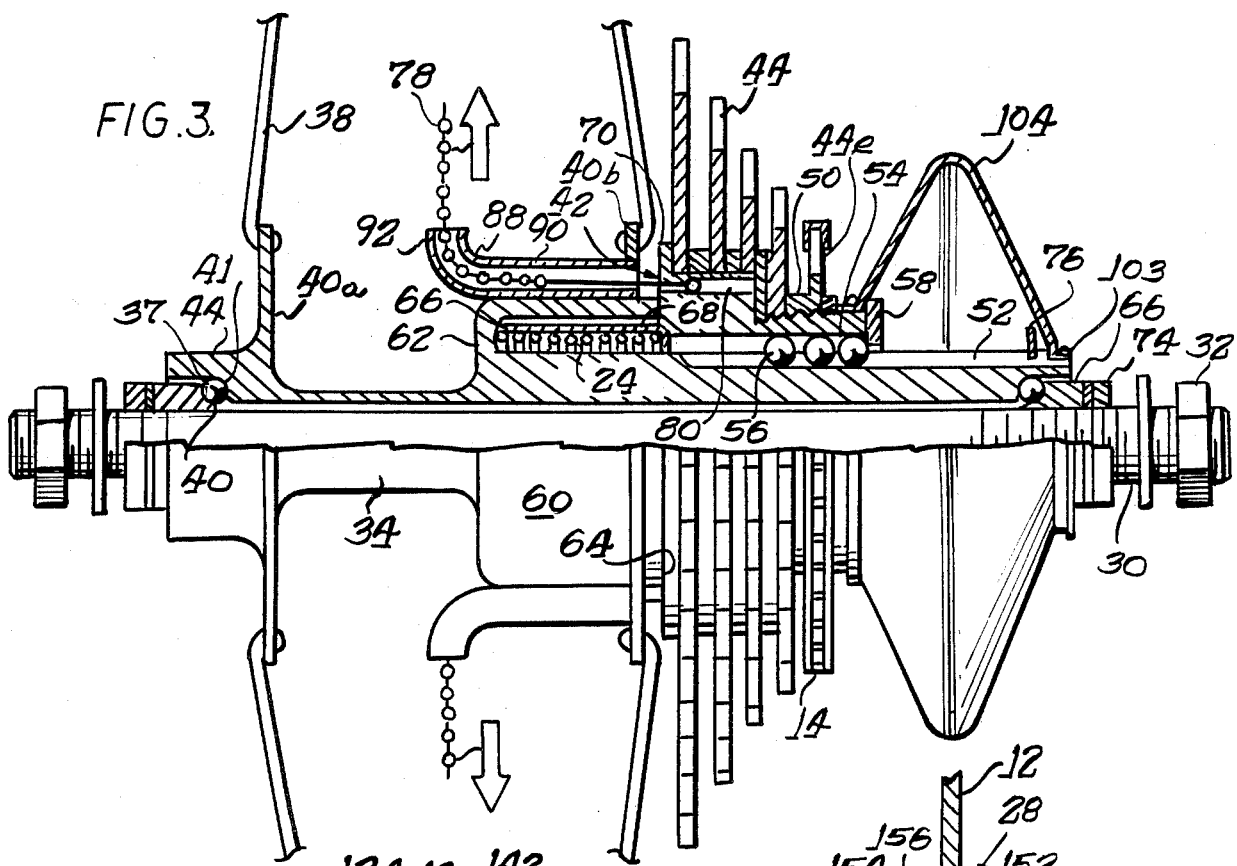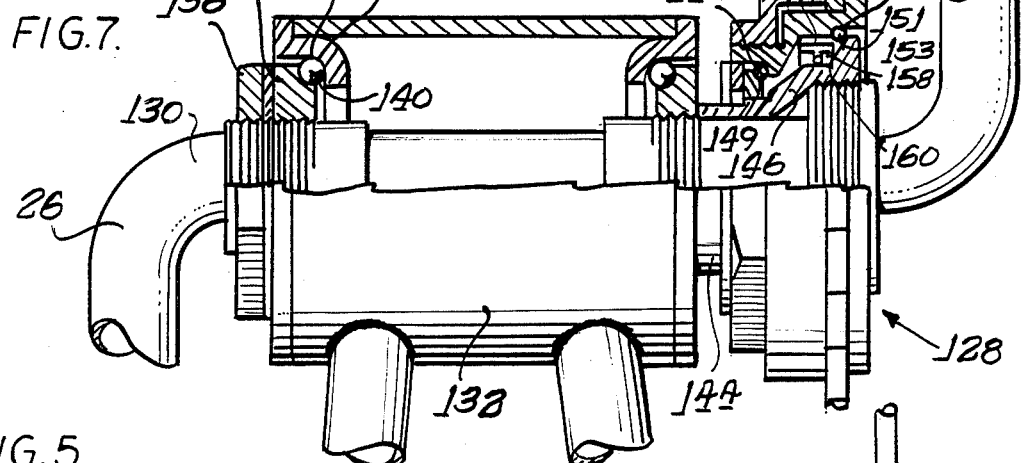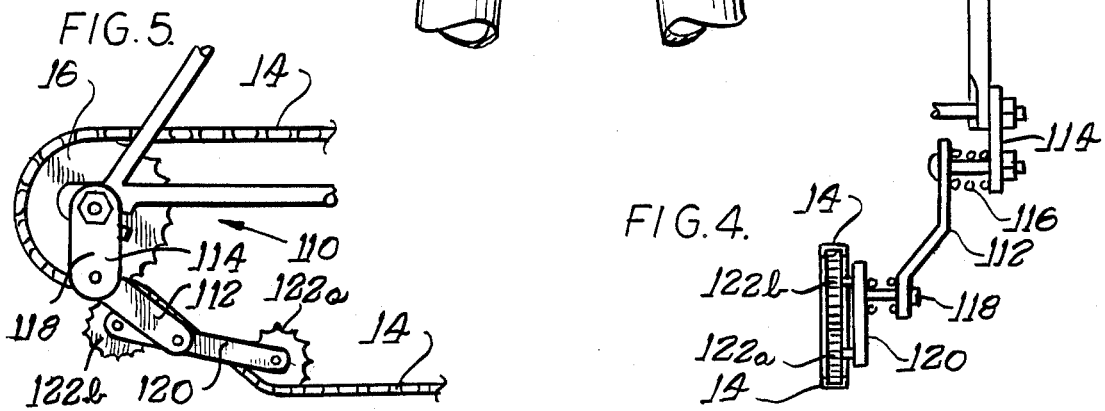

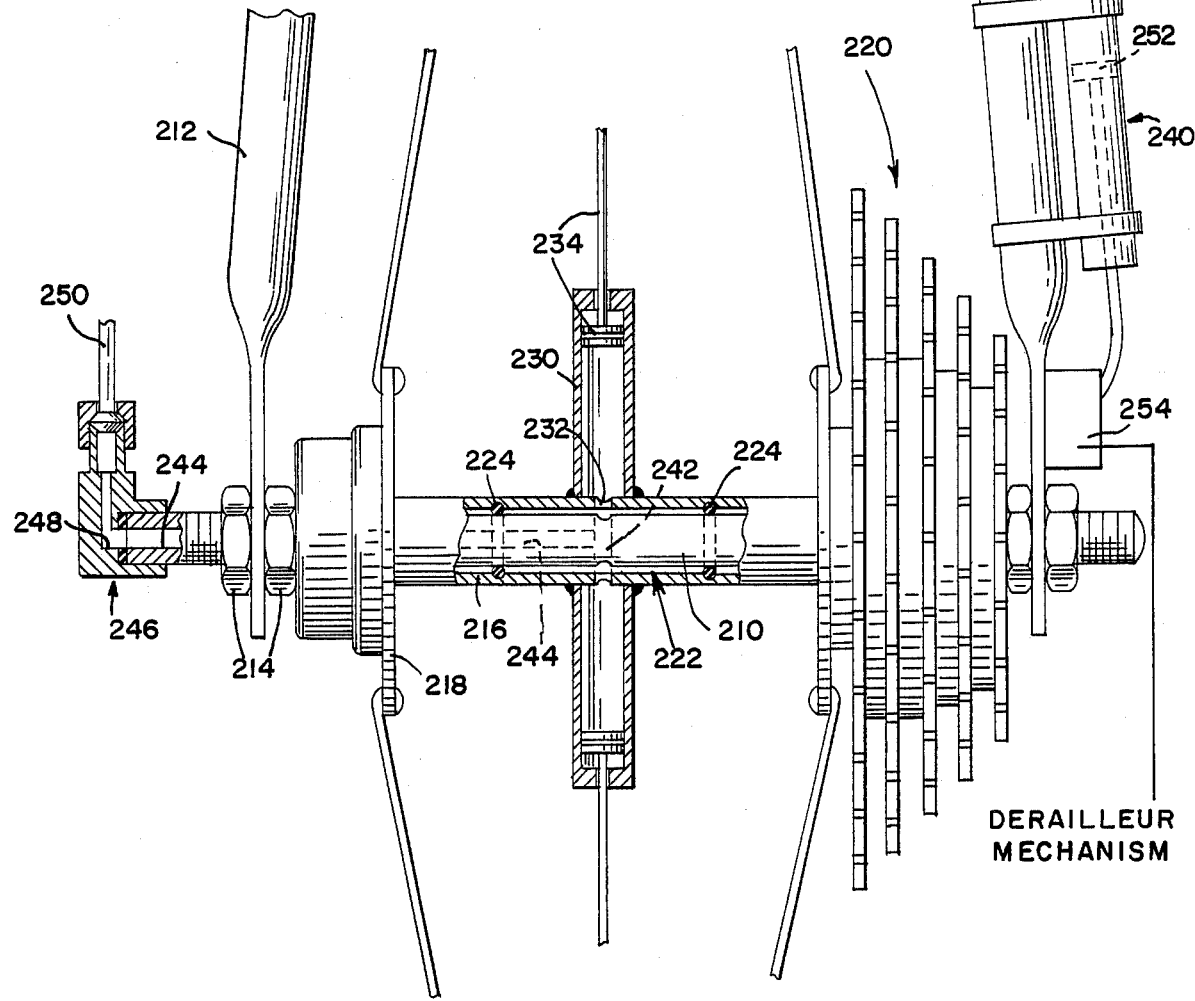
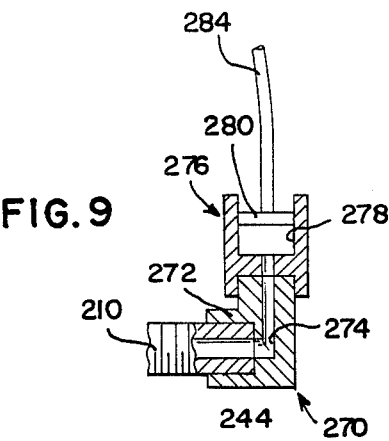

BICYCLE TRANSMISSION

REFERENCE TO RELATED APPLICATION

This application is a continuation-in-part of application Ser. No. 187,083, filed Sept. 15, 1980 now abandoned.

TECHNICAL FIELD

The present invention relates to bicycle transmissions and, more particularly, to automatic transmissions for bicycles.

BACKGROUND PRIOR ART

To facilitate bicycling over changing terrain, road conditions and weather conditions, bicycles commonly have multi-speed transmissions. One of the most common types of transmission systems for bicycles is the derailleur-type transmission in which the rear wheel and, in many cases, the pedal crank have associated multi-sprocketed assemblies whereby the gear ratio may be selectively adjusted by laterally moving the chain to engage with sprockets of varying diameter. In almost all commercial systems, the cyclist selects the gear ratio by manually operating one or more levers operably connected to the derailleur system. For a variety of reasons as outlined in U.S. Pat. No. 3,929,925, it would be desirable to have an automatic shifting device which adjusts the speed of the bicycle. While several automatic shifting devices have been proposed for bicycles or the like, see U.S. Pat. Nos. 4,201,094 and 2,956,443, no automatic shifting device has as yet achieved widespread commercial success. The need continues for automatic shifting devices which are sufficiently simple and reliable to gain commercial acceptance.

SUMMARY OF THE INVENTION

According to the present invention, an automatic transmission for a chain-driven vehicle, such as a bicycle, includes a frame having a crank and a crank-driven sprocket supported thereon with the frame having a fixed drive axle and a drive wheel supported on the drive axle. A multi-speed sprocket assembly having a plurality of sprockets is rotatable on the drive axle and is operatively connected to the drive wheel by a continuous drive chain engaging both the crank-driven sprocket and the sprocket assembly.

According to one aspect of the present invention, the transmission system includes an actuating mechanism supported on the drive wheel and spaced from the drive axle including an actuating member that is pivoted on the wheel and is actuated by centrifugal force for shifting the continuous chain to respective sprockets in response to the speed of the vehicle. In one embodiment of the invention, the sprocket-carrying member is axially shifted relative to an inner hub member carried by the rear axle and the shifting is accomplished through a mechanical link between the actuator member and the sprocket-carrying member. In another embodiment of the invention, a conventional derailleur is used to shift the gears and movement of the actuator member or weight is transmitted by hydraulic fluid. In the embodiment incorporating the hydraulic fluid as the transmission media between the actuator and the derailleur, the mechanism can be designed so that it can be sold as a conversion kit for any conventional bicycle that is presently on the market.

BRIEF DESCRIPTION OF SEVERAL VIEWS OF DRAWINGS

Other objects and advantages of the invention will become apparent from the following detailed description in reference to the accompanying drawings, in which:

FIG. 3 is a view similar to that of FIG. 2 showing the transmission apparatus in high gear position;

FIG. 5 is a front elevational view of the rear sprocket assembly and associated pivoted pulleys for maintaining tension of the chain;

FIG. 6 is a side elevational view of the pivoted pulleys of FIG. 5;

FIG. 7 is an elevational view, partially cut away, of a pedal crank-sprocket assembly including a one-direction clutch which connects the pedal crank to the front sprocket, FIG. 8 is a fragmentary view of the rear axle and associated transmission, showing a modified form of the invention; and, FIG. 9 is a partial cross-sectional view of a further modified form of the invention.

DETAILED DESCRIPTION

Figure 1:
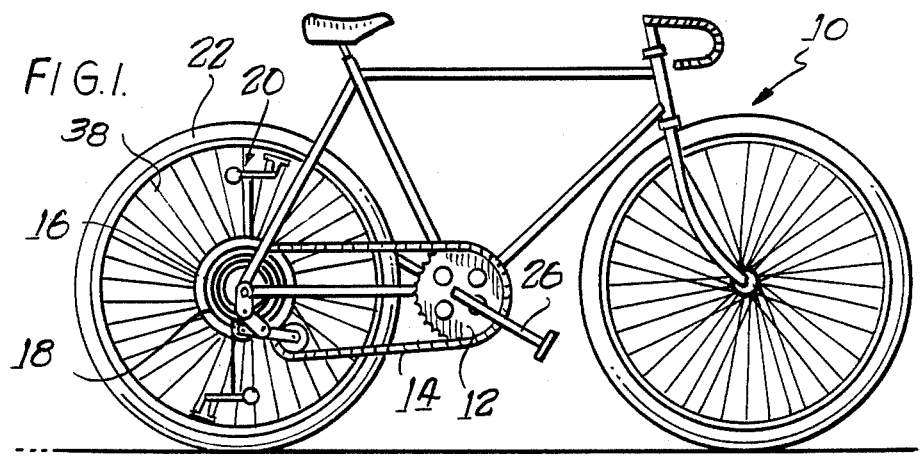
FIG. 1 is an elevational view of a bicycle with an automatic transmission system embodying various features of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In accordance with the present invention, an automatic variable-speed transmission is provided for a bicycle 10 (FIG. 1) or similar vehicle in which a crank-driven front sprocket 12 is connected by a drive chain 14 to a driven multi-sprocketed assembly 16 carried by the rear wheel axle with selective engagement of the chain with the various diameter sprockets 18 of the sprocket assembly being accomplished automatically with substantial variations in the speed of the vehicle. This is achieved by weighted speed actuators 20 responsive to the centrifugal force of the rotating bicycle wheel 22 to actuate the sprocket assembly 16 which is biased in the opposite direction by a spring 24 (FIG. 2) so that, for example, when the centrifugal force decreases, the spring shifts the sprocket assembly 16 relative to the chain 14.

In order to allow the bicycle rider to stop pedaling and allow wheels 22 to continue to rotate, i.e., for the rider and bicycle to coast as down a hill, a one-direction clutch is used at the pedal crank 26 with the clutch 28 (FIG. 7) being disengaged while the bicycle 10 is coasting. When the rider pedals, the clutch is engaged.

So that the invention may be more fully understood, the transmission mechanism will now be described in greater detail.

Figure 2:
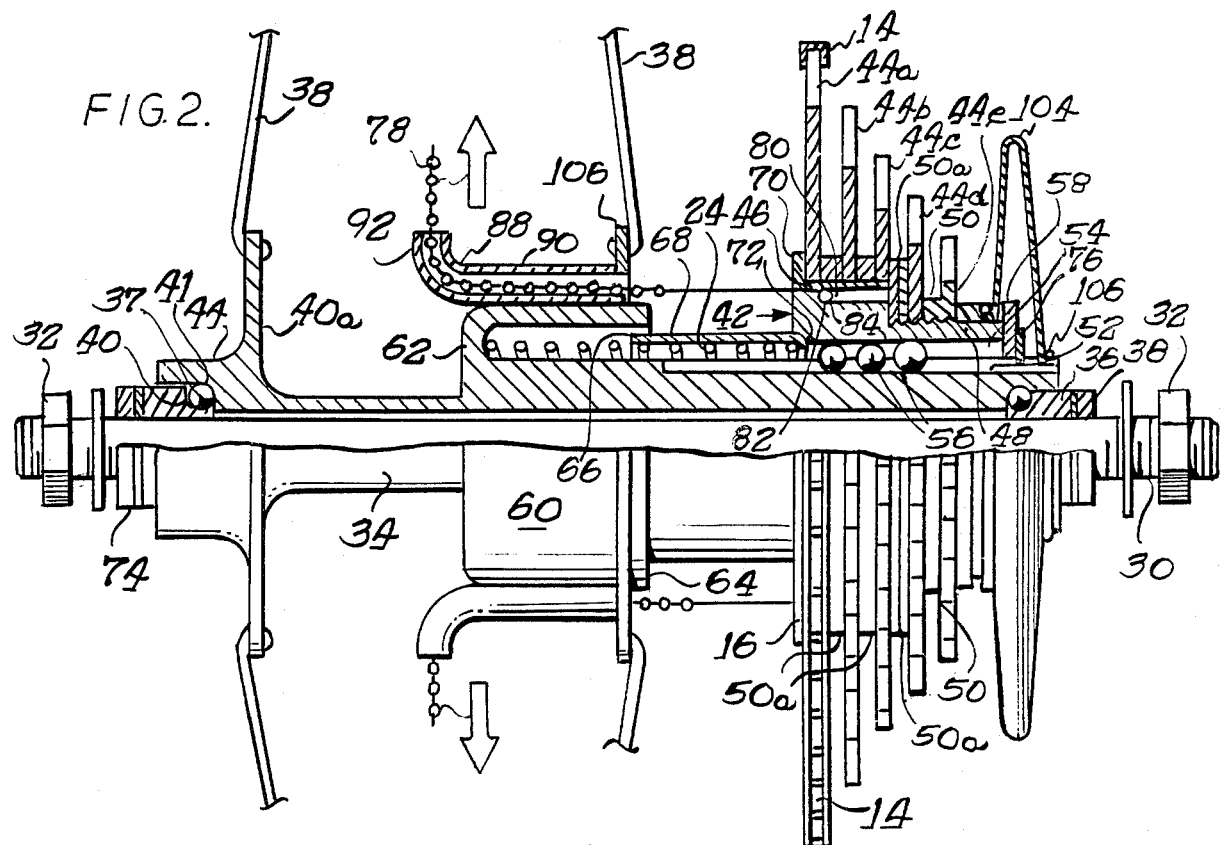
FIG. 2 is an elevational view, partially cut away, of the rear axle and associated transmission apparatus in the low gear position of the bicycle shown in FIG. 1.

The rear axle assembly shown in FIG. 2 includes a hub shaft 30 attachable to the bicycle frame as by a nut 32 at either end thereof and a hub shell 34 which rotates therearound. At either end of the hub shaft 30, ball holders 36 with bearing surfaces 40 cooperating with bearing surfaces 41 of complementary cylindrical end portions 44 of the hub shell 34 to hold standard bicycle bearings 37 therebetween to permit free rotation of the hub shell around the non-rotating hub shaft 30. The bicycle wheel rim is attached by spokes 38 to annular hub shell flanges 40a and 40b.

In standard derailleur transmission system, a sprocket assembly is secured to the hub shell to rotate therewith and is laterally fixed thereto, and the chain is laterally moved to selectively engage with the various sprockets of the sprocket system.

According to one aspect of the present invention, the chain 14 connecting the front sprocket 12 to the rear sprocket assembly 16 is laterally fixed in a single plane, and the sprocket assembly 16 is movable inward and outward to reposition itself relative to the chain, whereby engagement of the chain with the various sprockets is selected without the need for a conventional derailleur.

The respective sprockets 44a–44e are carried and shifted laterally by a sleeve or shell 42 which is telescoped over one end of the hub shell 34 outwardly of the hub flange 40b to which the spokes 38 are attached. The sleeve 42 has a first or large diameter portion 46 carrying the larger diameter sprockets 44a, 44b and 44c which are keyed by a key (not shown) to the sleeve 42 to turn the sleeve and the hub shell. Herein, the smaller diameter sprockets 44d and 44e are drivingly secured to the sleeve 42 to turn the same by being screw-threaded onto a threaded small diameter portion 48 of the sleeve 42. Mounted on the sleeve's smaller diameter portion between adjacent sprockets are spacer rings 50 which provide the desired separation between the sprockets 44 which is sufficient that the chain 14 does not rub against adjacent sprockets but small enough so that the chain does not become caught between sprockets.

It will be appreciated that to slide the sprocket assembly automatically in a lateral direction while the bicycle rider is applying a driving force to the chain 14 and a driving torque to one of the sprockets 44 requires a good sliding friction and drive mechanism between the hub shell 34 and the sprocket assembly. Herein, a bearing means is provided between the sprocket assembly and the hub and also acts to transfer the driving torque from the sprocket assembly to the rear wheel hub. Herein, the bearing means comprising ball bearings 56 slideable longitudinally in races defined by aligned grooves in respectively-facing portions of the hub shell 34 and the sleeve 42. More specifically, at various evenly-spaced circumferentail positions, complementary arcuate grooves 52 and 54 (FIG. 3) are provided in the inside diameter of the sprocket shell 42 and in the complementary outside diameter of the hub shell 34 which define cylindrical keyways therebetween which are parallel to the hub shaft axis. The cylindrical keyways each carry a plurality of ball bearings 56 with diameters slightly less than the keyway diameter. The bearings 56 key the hub shell 34 to the sprocket shell 42 at about three to four locations about the hub. An annular ring 58 is secured around the end of the lesser diameter portion 48 of the sprocket shell to close off the end of the keyway races and retain the ball bearings 56 in the cylindrical keyway races from their outer ends.

The biasing spring 24 which shifts the sprocket assembly in one lateral direction which is to increase the size of the driving sprocket 44, in this instance, is carried in an encircling cup-like portion 60 of the hub shell 34. The cup portion 60 has a closed end 62 generally midway between the hub shell flanges 40a and 40b and extends through the right-hand hub shell flange 40b where its open end 64 overlies the inner open end 66 of a protective cup 68 extending inward from the inner end of the sprocket shell. The closed end 72 of the protective cup 68 at the inner end 70 of the sprocket shell 42 closes off the inner end of the sprocket shell grooves 54 to retain the ball bearings 56 in the keyways. The hub shaft-encircling compressed coil spring 24 is enclosed within the interengaging cup portions 60 and 68 of the hub shell 34 and sprocket shell 70 and extends between the closed ends 62 and 72 thereof to bias the sprocket shell 72 outward. When the compression spring 24 is expanded to the maximum length permitted (as in FIG. 2) to shift the sprocket assembly to where the sprocket 44a engages the chain 14, the retainer ring 58 abuts a C-ring 76 disposed in an annular groove closely adjacent the outer end of the hub shell 34. When the sprocket assembly 16 is moved inward, of course, the chain 14 engages with progressively small sprockets 44 to change the rotation ratio between crank 26, and the sprocket assembly shifts to progressively higher gears.

To shift the sprocket assembly 16 against the force of the spring 24, the centrifugal actuators 20 are disposed at diametrically opposed locations on the rear drive wheel assembly and are each operably connected to the sprocket assembly 16 by a connecting means in the form of a chain 78. Herein, the chain is connected to a guide in the hub by hollow tubes 88 with ends of the chains fastened to the sprocket sleeve 42. More specifically, each bead chain 78 has an end extending through a reduced-in-diameter bore portion 82 to an enlarged spherical stop 84 in an enlarged diameter bore 80. The stop 84 on the end of the chain abuts the end of the bore 80 to transfer the pulling force of the bead chain to the sprocket assembly 16.

In order to change directions, each bead chain 78 is threaded through a J tube 88 which guides the bead chain around a right-angle bend, the J tube having a horizontal leg 90 along the outside of the cup portion 60 of the hub shell 34 coaxial with the bore 80 and extending through the right-hand hub shell flange 40b, and a leg 92 disposed midway between the left-hand and right-hand hub shell flanges 40a and 40b directed toward the bicycle wheel rim 22. The outer end of each bead chain 78 is connected to the corresponding actuator 20 to be pulled thereby with a force proportional to the speed of the rear drive wheel to exert a pull on the sprocket assembly 16 in opposition to the biasing force of the spring 24.

Figure 4:
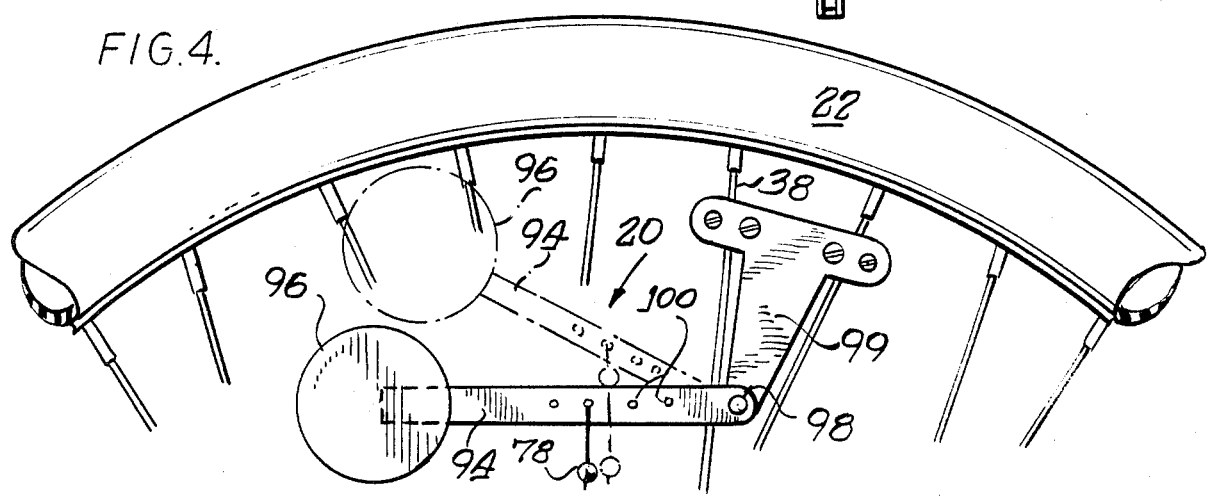
FIG. 4 is a fragmentary elevational view of the rear wheel of the bicycle shown in FIG. 1 illustrating an actuator which responds to the speed of the bicycles and shifts the engagement of the chain with the respective sprockets of the assembly with the chain.

Each centrifugal weight actuator 20, as best seen in FIG. 4, includes a rod 94 having a weight 96 at one end and pivotally mounted at its other end 98 on a bracket 99 secured by a screwed clamping plate to a pair of wheel spokes 38. The rod 94 and weights are mounted generally in the plane of the bicycle wheel between the left-hand and right-hand spokes. A plurality of radially-spaced holes 100 are provided in rod 94 which extends about one-half the distance from the pivot end 98 to the weight 96, and the end of the bead chain 78 is connected through one of the holes.

In a derailleur transmission system where the drive train jumps between different diameter sprockets 44 resulting in varying amounts of free chain, it is necessary to maintain chain tension with each of the engaged sprockets 44a-44e of the sprocket assembly 16 so that a loose chain 14 does not jump off the gear mechanism entirely. Similar to derailleur systems commonly in use, the present invention utilizes a chain tension mechanism indicated generally at 110 in FIG. 5. However, the chain tensioning mechanism performs a dual function of tensioning the chain and also maintaining the chain in a fixed longitudinal plane. The tensioning mechanism 110 includes an arm 112 which is pivotally mounted at its upper end 114 from the frame closely adjacent the outer end of the hub shaft 30 and an adjustable torsion spring 116 (FIG. 6) at the pivot point biases the arm so that its lower end 118 tends to swing backwards. Pivotally mounted at the lower end of the arm 112 is a cross-arm 120 having sprockets 122a and 122b rotatably mounted at either end thereof. A torsion spring 124 at the pivot point of the cross-arm 120 tends to bias the cross-arm to a horizontal position. The arm 112 from the hub shaft 30 is appropriately deformed out of plane, as best seen in FIG. 6, to locate the sprockets 122 of the cross-arm 120 generally in the plane of the drive chain 14. The portion of the drive chain 144 extending rearward from the lower side of the crank sprocket 12 winds below and up over the rear cross-arm pulley 122a, winds forward below and up over the front cross-arm pulley 122b, and backward below and up over the sprocket assembly 16. In the high gear position (FIG. 3), the arm 112 from adjacent the hub shaft 30 is biased toward its backward position and the cross-arm 120 is biased toward its horizontal position to effectively increase the distance which the drive chain 144 winds around the cross-arm pulley 122.

When the chain 14 is engaged with larger sprockets 44 in the lower gear positions, the chain which winds a greater distance around the larger sprockets pulls the hub shaft arm 112 forward and pulls the cross-arm 120 vertically to correspondingly shorten the travel of the chain around the cross-arm pulleys 122. Thus, the drive chain 14 maintained at all times under generally slack-free tension. A particular advantage of the present invention in which the chain 14 is laterally fixed is that the tension-adjusting sprockets 122 may be laterally fixed and the need for a derailleur mechanism is eliminated. The advantages of a laterally-fixed chain-adjusting mechanim 110 may best be appreciated by those who have tediously adjusted conventional bicycle transmission systems in which the lateral movement of the tension-adjusting mechanism must be coordinated with the lateral movement of the chain.

The tension on the bead chain 78, resulting from the outward biasing of the sprocket assembly 16 by the hub shell spring 24, and an adjustable torsion spring (not shown) at the sensor pivot end 98, maintain the actuator 20 in its rest position, shown in solid in FIG. 4 with the rod 94 generally transverse to a radius of the wheel 22. When the bicycle 10 moves, the centrifugal force of the wheel 22 tends to swing the weight 96 outward, overcoming the force of the pivot torsion spring and the hub shell spring 24. As the weight 96 swings outward, as shown in phantom line in FIG. 4, the rod 94 pulls the bead chain 78 which, in turn, pulls the sprocket assembly 16 inward. As the sprocket assembly 16 is pulled inward, the portion of chain 14 on the sprocket assembly is deformed out of its fixed plane until a portion of the chain catches on the next adjacent sprocket 44 and jumps thereto. As the speed increases, the transmission moves through successively higher gears as the chain 14 jumps to successively smaller sprockets 44 until, as shown in FIG. 3, the inner end 66 of the sprocket shell 42 abuts the outer end 62 of the hub shell cup portion 60. When the bicycle 10 slows, the process is reversed, and the hub shaft spring 24 progressively overcomes the decreasing pulling force of the actuator 22 to bias the sprocket assembly 16 outward, causing the chain 14 to jump progressively to lower gear sprockets 44 until in the low gear, with the drive chain on the largest sprocket 44a, the ball retaining ring 58 at the end of the sprocket shell 42 abuts the C-ring 76.

Throughout the movement of the sprocket shell 42 axially on axle 30, the chain is maintained in a fixed plane by the tensioning mechanism 110 and performs the function of a conventional derailleur mechanism.

Typically, each actuator 20 will have a six-inch long rod 94 with a disc-shaped weight at the end thereof which is about two-inches in diameter and ¼-inch thick. The weight 96 will typically travel about three inches between its rest (low gear) position and its high gear position.

While automatic bicycle transmission systems have been described in which the gear ratio is adjusted according to pedal pressure, a system in which the gear ratio is adjusted according to bicycle speed more appropriately determined the correct gear ratio. Whenever the bicycle 10 comes to a stop, the transmission shifts to its lower gear position which is most appropriate for starting up. On the other hand, when the bicycle 10 is moving rapidly, e.g., coasting down a steep hill, the transmission remains in a high gear despite the fact that no pressure at all is being exerted on the pedal.

From time-to-time, it may be necessary to adjust the tesnion so that the swinging outward of the weights 96 effect changing of the gears. This may be achieved by adjusting the torsion spring at the actuator pivot end 98 and by repositioning the actuator 20 on the spokes 38 to achieve tautness of the bead chain 78. By selection of the rod shaft hole 100 to which the bead chain 78 is attached, the speed range in which the transmission goes through its full range of gear changes may be adjusted.

A protecting bellows 104 is secured to the outer end of the hub shell 34 and to the outer end of the sprocket shell 42 by annular rings 106 to keep dirt out of the transmission mechanism, particularly the hub shell grooves 52 which are open at the outer ends. A close interfit of the hub shell cup portion 60 and the sprocket shell protective cup portion 68 keeps dirt from entering.

In conventional derailleur systems, a one-direction clutch is incorporated in the rear axle assembly which engages to transfer torque from the sprocket assembly to the hub shaft. In the present invention, the rear sprocket assembly is not clutched by a one-way clutch to the hub. In order to allow the bicycle 10 to coast so that the drive wheel may continue to move without the pedals being turned as when the rider holds the pedals stationary while coasting downhill, the one-direction clutch 28 is provided which connects the pedal crank 26 to the associated sprocket 28.

Illustrated in FIG. 7 is a freewheel assembly 128 in which the horizontal segment 130 of the pedal crank 26 is mounted for rotation through the drum portion 132 at the lower end of the bicycle frame. Ball holders 134 are secured to the pedal crank 26 by locknut 136 at either end of the drum 132 to rotate therewith and maintain standard bicycle bearings 138 between the ball holder bearing surfaces 140 and complementary bearing surfaces 142 of the drum 132. The clutch-sprocket free wheel assembly 128 is spaced by a spacer 144 from the right-hand end of the drum 132 to align the front sprocket 12 with the sprocket assembly 16. A crank shell 146 is secured to the crank 26 to rotate therewith and includes an inner annular bearing race 153 for outer bearings 151. An outer sprocket sleeve 154 is disposed about the crank shell and has outer bearing surfaces engaging the respective ball bearings 148 and 151 to permit independent rotation of the sprocket shell relative to the crank. The front sprocket 12 is keyed to the sprocket sleeve 154 to rotate the sleeve.

The clutch mechanism for clutching the pedal crank 26 and crank shell 146 to the sprocket sleeve 154 and the sprocket 12 comprises a clutch similar to that used conventionally for the rear wheels. Such known one-way clutches comprise a ring of ratchet teeth 156 disposed on the interior surface of the sprocket sleeve 154 between its bearing surfaces 152, and a plurality of pawls 158 on the outer surface of the crank shell 146. The pawls 158 are biased outwardly by individual springs 160 to engage the ratchet teeth 156 in a single direction only, i.e., when the crank 26 is providing forward torque to transfer torque from the crank 26 to the sprocket 12. Herein the teeth slide over the pawls without engaging them when the crank 26 is held stationary and the sprocket 12 and sprocket sleeve 154 continue to turn with the chain 14. Thus, the bicycle continues to travel during coasting without the crank being turned by the sprocket 12 which is continuing to turn with the front sprocket 12 and the engaged rear sprocket 44.

A slightly modified form of the invention is illustrated in FIG. 8 of the drawings and incorporates the same actuating mechanism 20 that is illustrated in FIG. 4 (not shown in FIG. 8). In this embodiment, a fixed axle 210 forms part of the frame 212 of a conventional bicycle and is supported on the frame by conventional locknuts 214. A center sleeve 216 extends between hub flanges 218 and forms part of sprocket assembly 220.

The fixed shaft 210 and rotatable sleeve 216 cooperate to define an annular chamber 222 which is sealed at opposite ends by suitable rotary sealing rings 224. The annular sealed chamber 222 is in communication with a pair of cylinders 230 through openings 232. The respective cylinders 230 each have a piston rod 234 reciprocated therein and the upper end of the piston rod is connected to an extension (not shown) on arm 94 (see FIG. 4) on the side of pivot pin 98 opposite weight 96.

The upper piston 234 can also be connected to the lower weighted device by suitable linkage so that outward movement of the weight will force the piston inward.

Annular sealed chamber 222 is also in communication with a master cylinder 240 through a radial opening 242 in shaft or drive axle 210 and an axial opening 244 also located in the shaft 210. Axial opening 244 extends to one end of shaft or drive axle 210 and has a coupling 246 attached thereto. The coupling has an internal opening 248 which is in communication with a flexible plastic hose 250 that extends over the wheel and is connected to the head end of master cylinder 240. The master cylinder has a piston rod 252 reciprocated therein and the outer end of the piston rod is connected to a conventional derailleur mechanism 254 that forms part of the present-day commercial bicycles of the multi-speed variety.

Thus, the sealed chamber 222 acts as a slave chamber which is in communication with the master cylinder 240 and the entire space between the two is filled with hydraulic fluid, such as oil, so that any relative movement of the piston rod 234 will be transmitted directly to the piston rod 252 to cause movement of the derailleur mechanism 254 in response to movements of the actuating mechanism 20.

This type of mechanism could easily be utilized to convert a conventional multi-speed bicycle having a conventional derailleur mechanism into an automatic-shift-type bicycle with only minimum modification of standard parts of the conventional bicycle. The only change in the conventional bicycle required would be to reverse the bias of the spring incorporated into the derailleur system.

A slightly further modified form of the invention is illustrated in FIG. 9 of the drawings and incorporates the majority of the components illustrated in FIG. 8. In the embodiment illustrated in FIG. 9, the position of the axle 210 with respect to the sprocket wheel assembly 220 is reversed so that the open end of axial opening 244 is located adjacent the end of the axle shaft where a conventional derailleur assembly 254 is located. In this embodiment of the invention, the axle fitting or coupling 270 includes a first element 272 that is threaded onto the outer open end of the axle 210 and has an opening 274 in communication with opening 244. The master cylinder element 276 is coupled directly to the free end of coupling 272 and has a master cylinder chamber 278 in which a piston 280 is reciprocated. The piston 280, in turn, is connected to a flexible cable 284 which has its opposite end connected to the derailleur mechanism.

With this embodiment, any conventional multi-speed bicycle could easily be converted into an automatic multi-speed bicycle version by merely purchasing a kit that would include the special drive axle, the specific sleeve for defining the sealed chamber, and the appropriate fittings associated therewith, along with the centrifugal force actuating device of the present invention.

While this invention has been described in terms of a preferred embodiment, modifications obvious to one skilled in the art may be made without departing from the scope of the present invention. While the invention has been described in terms of a five-speed bicycle, the invention could be adapted to a ten- or fifteen-speed bicycle by providing mechanisms whereby a multi-sprocketed crank freewheel may be moved manually inward and outward of the frame hub so that the bicycle may be operated in a selected register according to the fatique of the cycler with the gear sprocket assembly automatically going through its range of gears according to the speed of the cycle. The automatic transmission, described herein, is, of course, applicable to other chain-driven vehicles such as tricycles of the type popular with older people.

The pivoted speed actuator described in conjunction with the invention might be replaced with a radially-moving weight on the order of the weight adjusters described in U.S. Pat. No. 3,885,814.

Various features of the invention are set forth in the following claims.

I claim:

1. An automatic transmission system for a chain drive vehicle comprising a frame having a crank and a crank-driven sprocket supported thereon; said frame having a fixed drive axle with a drive wheel supported on said axle, a multi-speed sprocket assembly having a plurality of sprockets rotatable on said drive axle and operatively connected to said drive wheel, a continuous drive chain engaging said crank-driven sprocket and engageable with each of said sprocket of said sprockets assembly to drive said drive wheel at different speeds dependent upon which of said sprockets is engaged, a derailleur mechanism supported on said frame for shifting said drive chain and actuating means for said derailleur mechanism, said actuating means including a sleeve surrounding said drive axle and defining a sealed chamber therebetween, a master cylinder communicating with said sealed chamber and connected to said derailleur mechanism with encapsulated fluid in said sealed chamber and said master cylinder, and actuating means on said drive wheel for shifting said encapsulated fluid as a function of changes in speed of said drive wheel.

2. An automatic transmission system as defined in claim 1, in which said actuating means includes at least one cylinder extending from said sleeve and rotatable therewith and a piston reciprocated in said one cylinder and moved in response to changes in speed of said drive wheel.

3. An automatic transmission system as defined in claim 2, in which said actuting means includes centrifugal actuator means on said drive wheel connected to said piston.

4. An automatic transmission system as defined in claim 3, in which said actuating means includes first and second diametrically-opposed, radially-extending cylinders communicating with said sealed chamber with first and second pistons respectively reciprocated in said cylinders and first and second diametrically-opposed centrifugal actuators respectively connected to said pistons.

5. An automatic transmission system as defined in claim 1, in which said master cylinder is supported on an end of said drive axle and said drive axle has an axial bore communicating at one end with said sealed chamber and at an opposite end with said master cylinder.

* * * * *